(12) United States Patent
Mizoguchi

(10) Patent No.: US 7,697,181 B2
(45) Date of Patent: Apr. 13, 2010

(54) ACTUATOR, OPTICAL SCANNER AND IMAGE FORMING APPARATUS

(75) Inventor: Yasushi Mizoguchi, Chino (JP)

(73) Assignee: Seiko Epson Corporation (JP)

( * ) Notice: Subject to any disclaimer, the term of this patent is extended or adjusted under 35 U.S.C. 154(b) by 266 days.

(21) Appl. No.: 12/030,383

(22) Filed: Feb. 13, 2008

(65) Prior Publication Data

US 2008/0218823 A1 Sep. 11, 2008

(30) Foreign Application Priority Data

Mar. 7, 2007 (JP) ............................. 2007-057816

(51) Int. Cl.
*G02B 26/08* (2006.01)
(52) U.S. Cl. .............. 359/199.3; 359/199.1; 359/200.7; 359/213.1; 310/10
(58) Field of Classification Search .............. 359/198.1, 359/199.3, 200.7
See application file for complete search history.

(56) References Cited

U.S. PATENT DOCUMENTS 6,924,915 B2 * 8/2005 Hirose et al. .............. 359/199.3

FOREIGN PATENT DOCUMENTS

JP 08-322227 12/1996

* cited by examiner

*Primary Examiner*—James Phan
(74) *Attorney, Agent, or Firm*—Harness, Dickey & Pierce, P.L.C.

(57) ABSTRACT

An actuator includes: a first vibrating system having a frame-like driving member and a pair of first axis members holding the driving member from both sides so that the driving member is rotatable about an X axis; a second vibrating system having a movable plate provided inside the driving member and a pair of second axis members holding the movable plate on the driving members from both sides so that the movable plate is rotatable about a Y axis orthogonal to the X axis; a driving unit including a permanent magnet provided on the driving member, a coil provided to oppose the permanent magnet and a voltage applying unit applying voltage to the coil; and a spacer sandwiched between the driving member and the permanent magnet so as to form space preventing intervention by the movable plate. The permanent magnet is provided such that a line segment connecting both poles of the permanent magnet inclines, in a plan view of the movable plate, with respect to the X axis and the Y axis. The voltage applying unit includes a voltage generating portion generating a first alternating voltage and a second alternating voltage having different frequencies and a voltage superimposing portion superimposing the first voltage and the second voltage. The voltage superimposed at the voltage superimposing portion is applied to the coil so that the movable plate rotates about the X axis with a frequency of the first voltage and about the Y axis with a frequency of the second voltage.

12 Claims, 6 Drawing Sheets

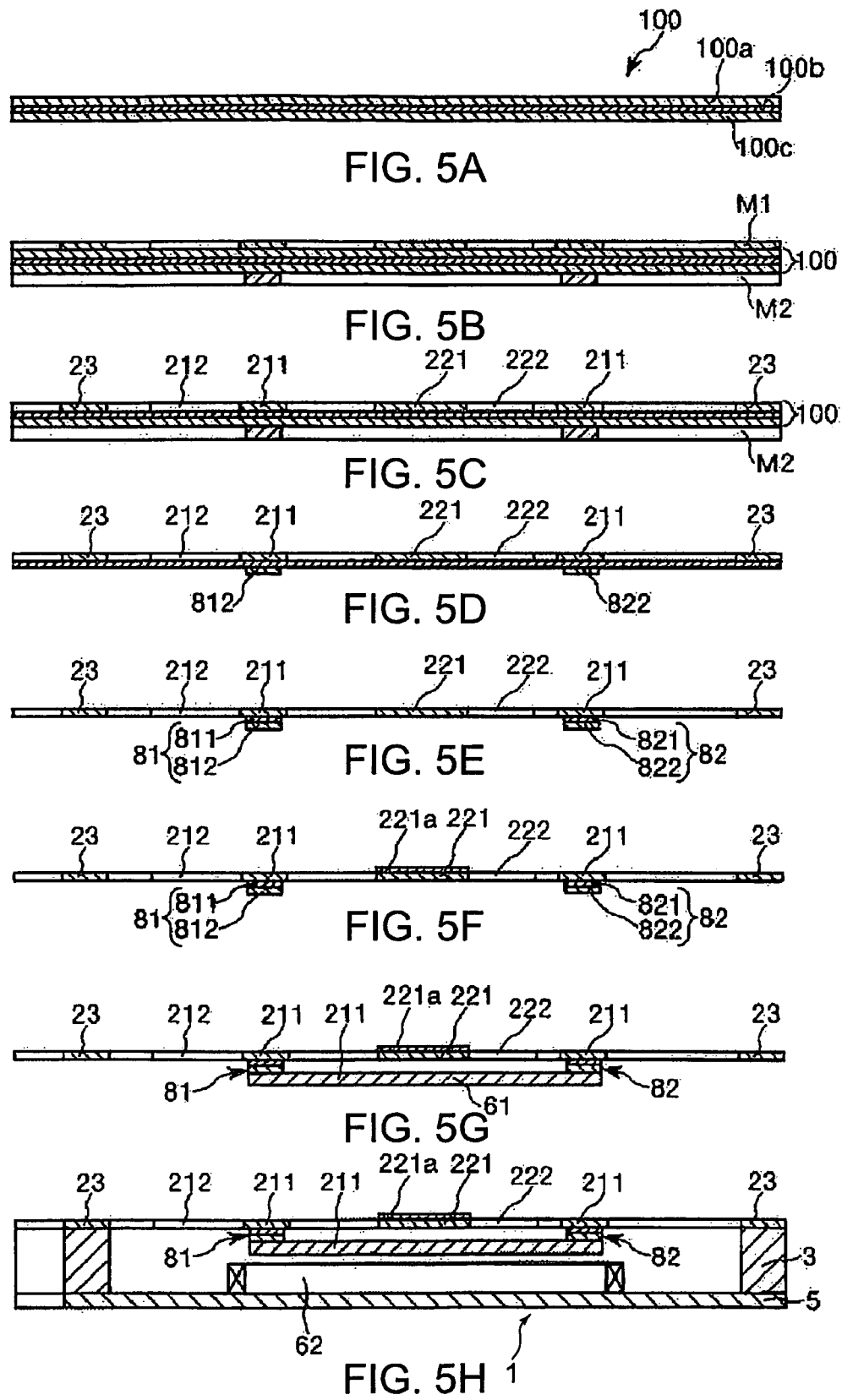

ACTUATOR, OPTICAL SCANNER AND IMAGE FORMING APPARATUS

BACKGROUND OF THE INVENTION

1. Technical Field

The present invention relates to an actuator, an optical scanner and an image forming apparatus.

2. Related Art

As an optical scanner used for drawing by utilizing optical scanning in a printer or the like, there is known one performing two-dimensional scanning (see, for example JP-A-08-322227).

The optical scanner disclosed in JP-A-08-322227 has a scanner main body including a frame-like outer movable plate, a pairs of first torsion bars axially supporting the outer movable plate so that the outer movable plate is swingably supported (rotatable) about an X axis, an inner movable plate provided inside the outer movable plate, a pair of second torsion bars axially supporting the inner movable plate so that the inner movable plate is swingable about a Y axis orthogonal to the X axis, a pair of driving coils respectively provided in the outer movable plate and the inner movable plate, and a pair of permanent magnets provided so as to oppose each other through the intermediation of the scanner main body.

In such the optical scanner, however, the permanent magnets are provided so as to be opposite to each other through the intermediation of the scanner main body, so miniaturization of the light scanner can hardly be achieved. Further, the outer movable plate and the inner movable plate are respectively provided with one driving coil, so it is difficult to achieve cost reduction.

SUMMARY

An advantage of the present invention is to provide an actuator, an optical scanner and an image forming apparatus, according to which low cost and miniaturization can be achieved while the movable plate can rotate about an X axis and a Y axis orthogonal to the X axis.

An actuator according to one aspect of the invention includes: a first vibrating system having a frame-like driving member and a pair of first axis members holding the driving member from both sides so that the driving member is rotatable about an X axis; a second vibrating system having a movable plate provided inside the driving member and a pair of second axis members holding the movable plate on the driving members from both sides so that the movable plate is rotatable about a Y axis orthogonal to the X axis; a driving unit including a permanent magnet provided on the driving member, a coil provided to oppose the permanent magnet and a voltage applying unit applying voltage to the coil; and a spacer sandwiched between the driving member and the permanent magnet so as to form space preventing intervention by the movable plate. The permanent magnet is provided such that a line segment connecting both poles of the permanent magnet inclines, in a plan view of the movable plate, with respect to the X axis and the Y axis. The voltage applying unit includes a voltage generating portion generating a first alternating voltage and a second alternating voltage having different frequencies and a voltage superimposing portion superimposing the first voltage and the second voltage. The voltage superimposed at the voltage superimposing portion is applied to the coil so that the movable plate rotates about the X axis with a frequency of the first voltage and about the Y axis with a frequency of the second voltage.

As a result, the actuator capable of achieving reduction in cost and miniaturization while the movable plate can rotate about the X axis and the Y axis.

In this case, it is preferable that the spacer be integrally formed with the driving member.

Accordingly, the fabrication of the actuator can be simplified.

In this case, it is preferable that the driving member be formed from one Si layer of a SOI substrate and the spacer be formed from at least a $SiO_2$ layer. The SOI substrate has the $SiO_2$ layer, the one Si layer and the other Si layer.

As a result, it becomes possible to more reliably form the spacer on the driving member in a desired place.

In this case, it is preferable that the spacer be provided as one pair.

As a result, the pair of spacers can be used as a positioning portion for the permanent magnet.

In this case, it is preferable that the frequency of the second voltage be the same as a resonance frequency of the second vibrating system and the frequency of the first voltage be different from a resonance frequency of the first vibrating system.

As a result, it becomes possible to let the movable plate highly smoothly rotate about the X axis and the Y axis.

In this case, it is preferable that the frequency of the second voltage be larger than the frequency of the first voltage.

As a result, it becomes possible to let the movable plate rotate more reliably and smoothly about the X axis with the frequency of the first voltage and also about the Y axis with the frequency of the second voltage.

In this case, it is preferable that the permanent magnet have a longitudinal shape and being provided along a line segment passing through an intersecting point of the X axis and the Y axis and inclining with respect to one of the X axis and the Y axis at an angle of 30° to 60°

By this, it becomes possible to let the movable plate rotate highly smoothly about the X axis and the Y axis.

In this case, it is preferable that the coil be provided directly under the permanent magnet.

As a result, it becomes possible to let the magnetic field generated from the coil efficiently effect on the permanent magnet. Accordingly, power saving and miniaturization of the actuator can be achieved.

In this case, it is preferable that the coil be, seen in a plan view of the movable plate, formed so as to surround outer periphery of the driving member.

As a result, the distance between the coil and the permanent magnet can become highly small, thereby making it possible to let the magnetic field generated from the coil efficiently effect on the permanent magnet. That is to say, power saving and miniaturization of the actuator can be achieved while the rotation angle of the movable plate can be enlarged.

In this case, it is preferable that the movable plate include a light reflecting portion having light reflective properties on one surface thereof opposite from the other surface adjacent to the permanent magnet.

As a result, the actuator according to the invention can be used as an optical device to be provided in an image forming apparatus such as a laser printer, a barcode reader, a confocal scanning laser microscope or an imaging display.

According to a second aspect of the invention, an optical scanner includes a first vibrating system having a frame-like driving member and a pair of first axis members holding the driving member from both sides so that the driving member is rotatable about an X axis; a second vibrating system having a movable plate provided inside the driving member and a pair of second axis members holding the movable plate on the driving members from both sides so that the movable plate is rotatable about a Y axis orthogonal to the X axis; a driving unit including a permanent magnet provided on the driving member, a coil provided to oppose the permanent magnet and a voltage applying unit applying voltage to the coil; and a spacer sandwiched between the driving member and the permanent magnet so as to form space preventing intervention by the movable plate. The permanent magnet is provided such that a line segment connecting both poles of the permanent magnet inclines, in a plan view of the movable plate, with respect to the X axis and the Y axis. The voltage applying unit includes a voltage generating portion generating a first alternating voltage and a second alternating voltage having different frequencies and a voltage superimposing portion superimposing the first voltage and the second voltage. The voltage superimposed at the voltage superimposing portion is applied to the coil so that the movable plate rotates about the X axis with a frequency of the first voltage and about the Y axis with a frequency of the second voltage so as to perform a two-dimensional scanning of light reflected at the light reflecting portion.

Accordingly, it becomes possible to provide an optical scanner according to which low cost and miniaturization can be achieved while the movable plate can rotate about two axes intersecting each other (the X axis and the Y axis), thereby performing two-dimensional scanning of light.

According to a third aspect of the invention, an image forming apparatus includes an optical scanner including: a first vibrating system having a frame-like driving member and a pair of first axis members holding the driving member from both sides so that the driving member is rotatable about an X axis; a second vibrating system having a movable plate provided inside the driving member and a pair of second axis members holding the movable plate on the driving members from both sides so that the movable plate is rotatable about a Y axis orthogonal to the X axis; a driving unit including a permanent magnet provided on the driving member, a coil provided to oppose the permanent magnet and a voltage applying unit applying voltage to the coil; and a spacer sandwiched between the driving member and the permanent magnet so as to form space preventing intervention by the movable plate. In the scanner, the permanent magnet is provided such that a line segment connecting both poles of the permanent magnet inclines, in a plan view of the movable plate, with respect to the X axis and the Y axis, and the voltage applying unit includes a voltage generating portion generating a first alternating voltage and a second alternating voltage having different frequencies and a voltage superimposing portion superimposing the first voltage and the second voltage. The voltage superimposed at the voltage superimposing portion is applied to the coil so that the movable plate rotates about the X axis with a frequency of the first voltage and about the Y axis with a frequency of the second voltage so as to perform a two-dimensional scanning of light reflected at the light reflecting portion.

Accordingly, it becomes possible to provide an image forming apparatus provided with an optical scanner according to which low cost and miniaturization can be achieved while the movable plate can rotate about two axes intersecting each other (the X axis and the Y axis), thereby performing a two-dimensional scanning of light.

BRIEF DESCRIPTION OF THE DRAWINGS

The invention will be described with reference to the accompanying drawings, wherein like numbers reference like elements.

FIG. 5A is a view for illustrating a method for manufacturing the actuator shown in FIG. 1.

FIG. 5B is a view for illustrating a method for manufacturing the actuator shown in FIG. 1.

FIG. 5C is a view for illustrating a method for manufacturing the actuator shown in FIG. 1.

FIG. 5D is a view for illustrating a method for manufacturing the actuator shown in FIG. 1.

FIG. 5E is a view for illustrating a method for manufacturing the actuator shown in FIG. 1.

FIG. 5F is a view for illustrating a method for manufacturing the actuator shown in FIG. 1.

FIG. 5G is a view for illustrating a method for manufacturing the actuator shown in FIG. 1.

FIG. 5H is a view for illustrating a method for manufacturing the actuator shown in FIG. 1.

DESCRIPTION OF EXEMPLARY EMBODIMENTS

Hereinafter, preferable embodiments of an actuator, an optical scanner and an image forming apparatus according to the present invention will be described with reference to the attached drawings.

Figure 1:
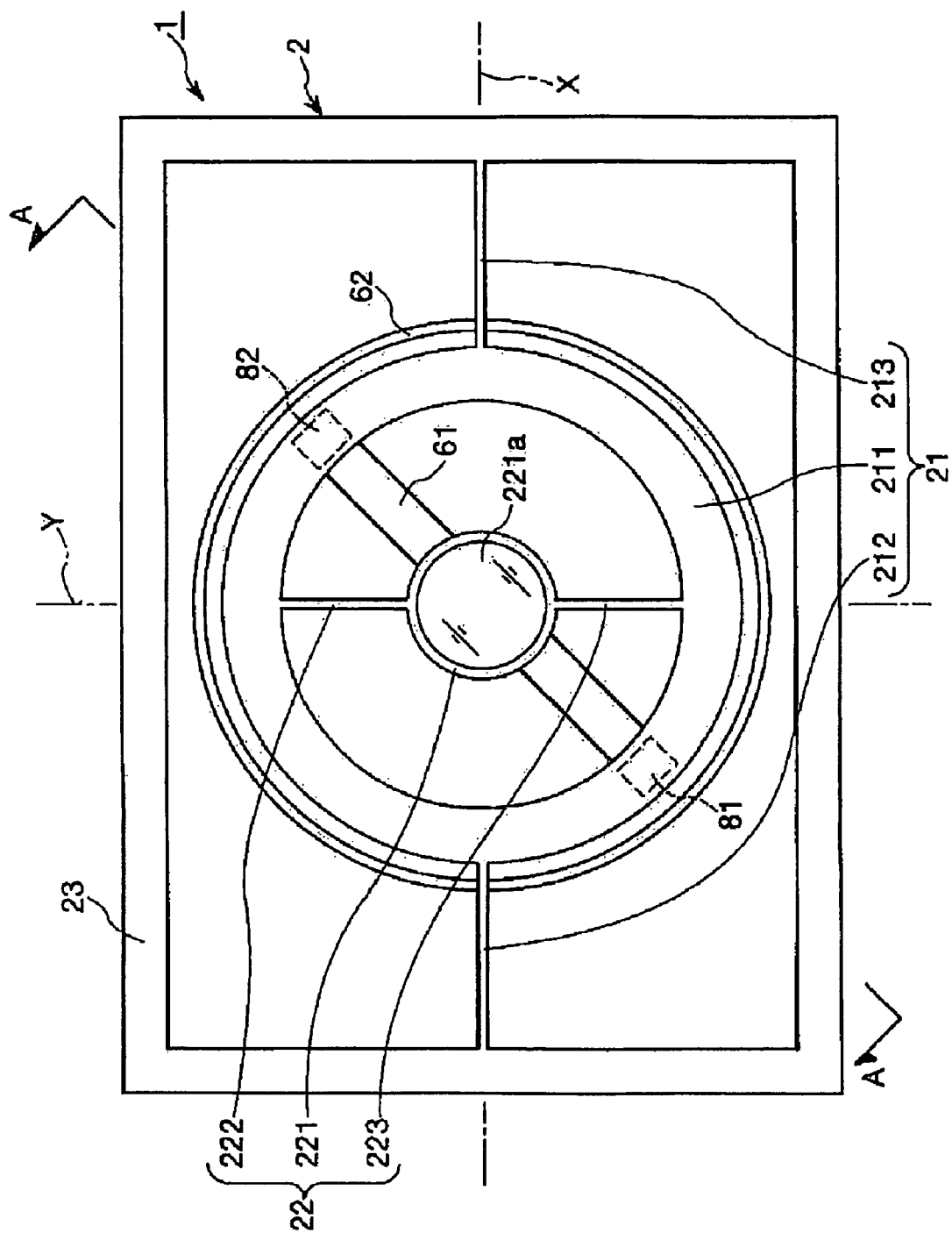
FIG. 1 is a plan view showing a preferable embodiment of an actuator according to the invention.
Figure 2:
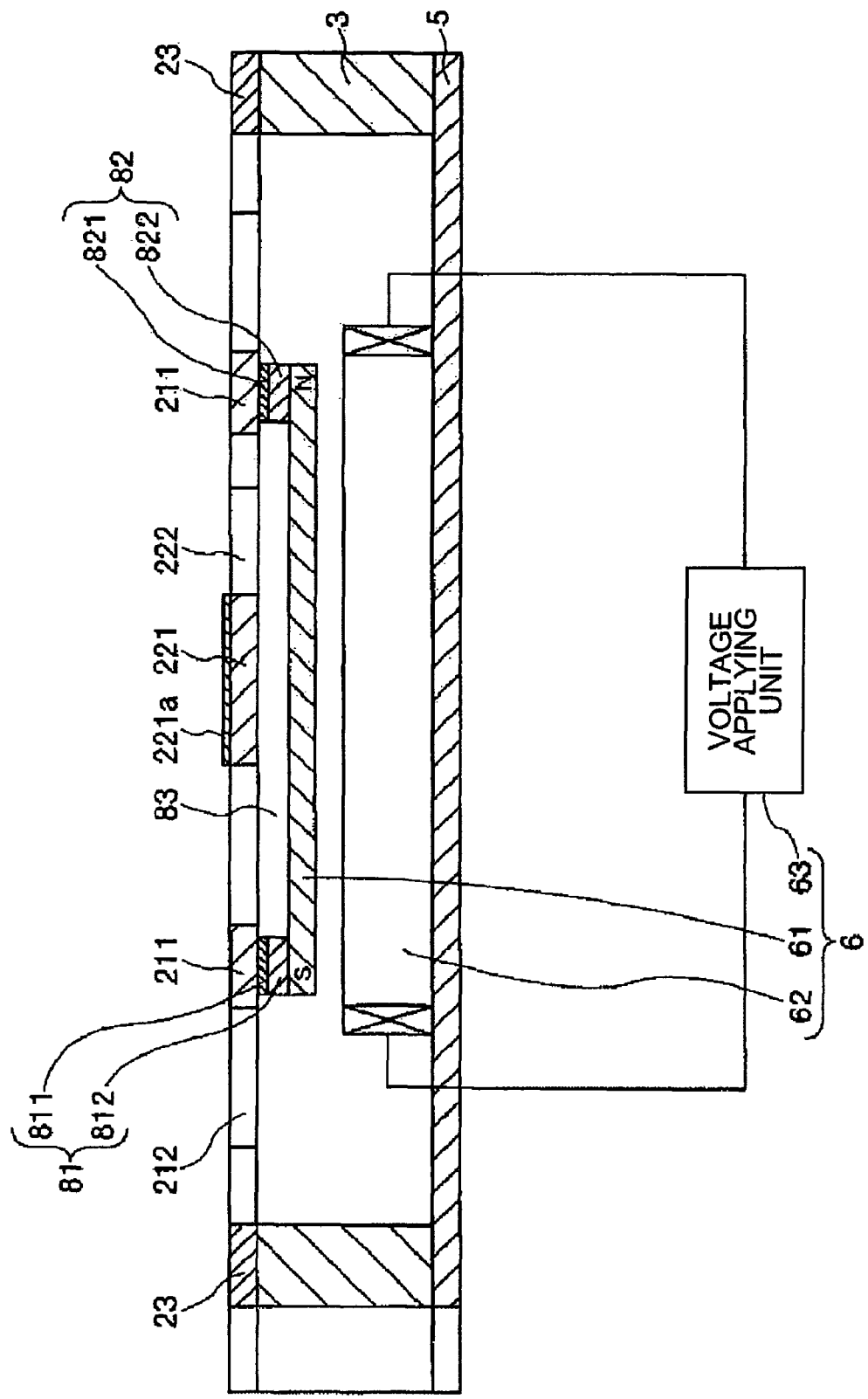
FIG. 2 is a sectional view taken along with the line A-A of FIG. 1.
Figure 3:
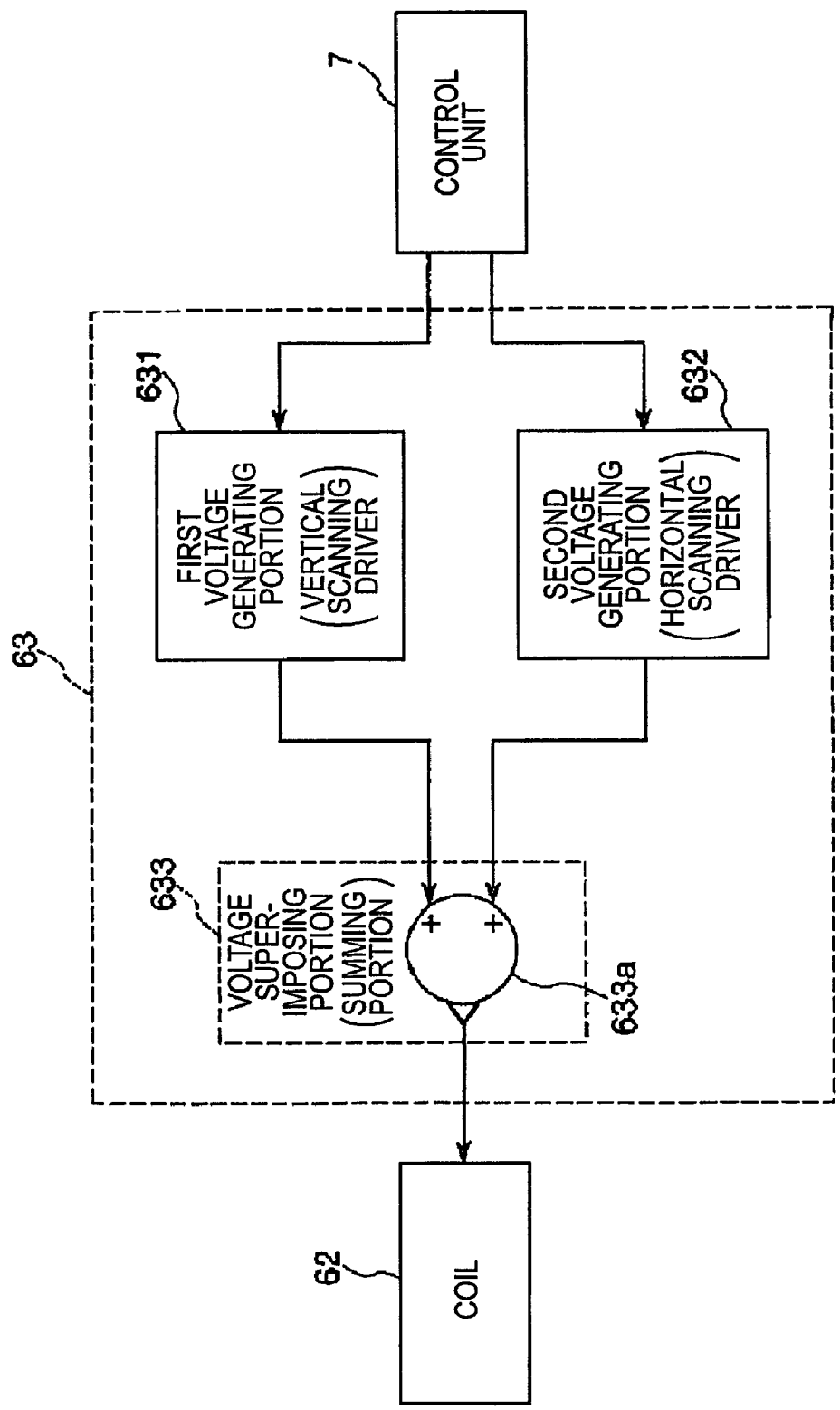
FIG. 3 is a block diagram showing a voltage applying unit of a driving unit included in the actuator shown in FIG. 1.
Figure 4A:
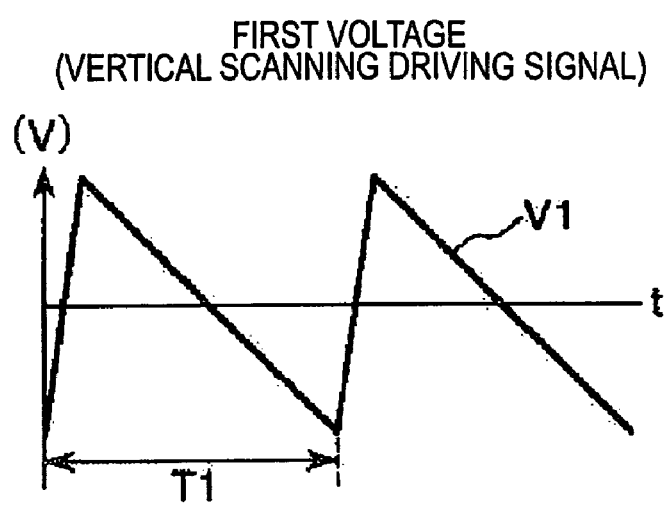
FIG. 4A is a view showing an example of a first voltage generating portion shown in FIG. 3.
Figure 4B:
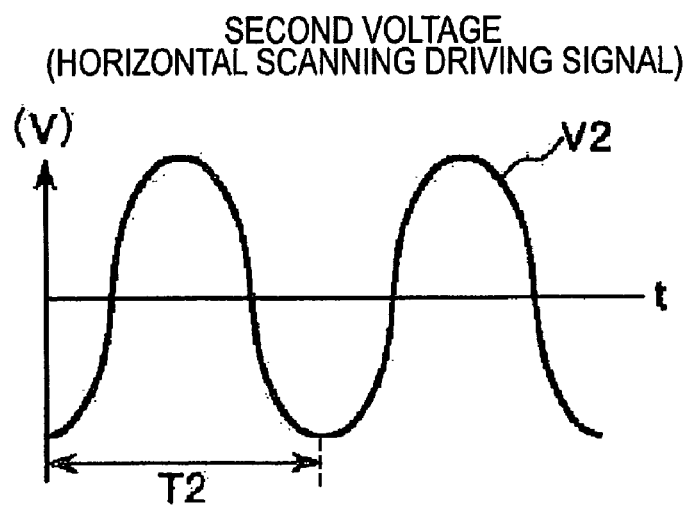
FIG. 4B is a view showing an example of a second voltage generating portion shown in FIG. 3.

FIG. 1 is a plan view showing a preferable embodiment of the actuator according to the invention. FIG. 2 is a sectional view along with the line A-A of FIG. 1. FIG. 3 is a block diagram showing a driving unit included in the actuator shown in FIG. 1. FIG. 4A and FIG. 4B respectively show examples of a generated voltage at a first voltage generating portion and a second voltage generating portion. Note that hereinafter for the sake of convenience of explanation the front side of FIG. 1 is called upper side, the rear side thereof is called bottom side, the right side thereof is called right side and the left side thereof is called left side. Further, the upper side of FIG. 2 is called upper side, the bottom side thereof is called bottom side, the right side thereof is called right side and the left side thereof is called left side.

As shown in FIG. 1, the actuator 1 includes a base body 2 having a first vibrating system 21 and a second vibrating system 22. As shown in FIG. 2, the actuator 1 includes a supporting substrate 3 that supports the base body 2, an opposite substrate 5 opposite to the base substrate 2 through the intermediation of the supporting substrate 3, driving units that respectively drive the first vibrating system 21 and the second vibrating system 22, and spacers 81, 82 that form space 83.

As shown in FIG. 1, the base body 2 includes a frame-like supporting portion 23, the first vibrating system 21 supported by the supporting portion 23, and the second vibrating system 22 supported by the first vibrating system 21.

The first vibrating system 21 includes a frame-like driving member 211 provided inside the supporting portion 23 and a pair of first shaft members 212, 213 that support the driving member 211 from both sides on the supporting portion 23. Further, the second vibrating system 22 includes a movable plate 22 provided inside the frame-like driving member 211 and a pair of second axis members 222, 223 that support the movable plate 221 from both sides on the driving member 211.

In other words, the base body 2 includes the movable plate 221, the pair of second axis members 222, 223, the driving member 211, the pair of first axis members 212, 213 and the supporting portion 23.

The driving member 211 has annular shape seen in a plan view of FIG. 1 (i.e., seen in a plan view of the movable plate 221). However, it should not be construed restrictively. The shape of the driving member 211 is not limited thereto as long as it is frame-like shape. Provided on the bottom side of the driving member 211 is a permanent magnet (described later) through the intermediation of spacers 81, 82. The driving member 211 thus described is supported by the pair of first axis members 212, 213 from the both sides on the supporting portion 23.

The first axis members 212, 213 each have longitudinal shape and are elastically deformable. Each of the first axis members 212, 213 connects the driving member 211 to the supporting member 23 so that the driving member 211 is rotatable with respect to the supporting member 23. The first axis members 212, 213 thus described are provided so as to be coaxial to each other and constructed such that the driving member 211 rotates about the axis shared by the first axis members (hereinafter called rotation center axis X) with respect to the supporting member 23.

The movable plate 221 provided inside the driving member 211 has a ring-like shape seen in plan view of FIG. 1. However, it should not be construed restrictively. The shape of the movable plate 221 is not limited thereto as long as it can be provided inside the driving member 211. Provided on the upper surface (the surface far from the opposite substrate 5) is a light reflecting portion 221a that is light-reflective. The movable plate 221 thus described is supported by the pair of second axis members 222, 223 from the both sides on the driving members 211.

The second axis members 222, 223 each have longitudinal shape and are elastically deformable. Each of the second axis members 222, 223 connects the movable plate 221 to the driving member 211 so that the movable plate 221 is rotatable with respect to the driving member 211. The second axis members 222, 223 thus described are provided so as to be coaxial to each other and constructed such that the movable plate 221 rotates about the axis shared by the second axis members (hereinafter called rotation center axis Y) with respect to the driving member 211.

As shown in FIG. 1, the rotation center axis X and the rotation center axis Y intersect each other. In other words, the angle made by the rotation center axis X and the rotation center axis Y is 90°. Further, the center of the driving member 211 and the center of the movable plate 221 are both located at the intersecting point of the rotation center axis X and the rotation center axis Y, seen in a plan view of FIG. 1.

The main material of the base body 2 thus described is, for example, silicon so that the movable plate 221, the second axis members 222, 223, the driving member 211, the first axis members 212, 213 and the supporting portion 23 are integrally formed. As thus silicon is used as the main material, it becomes possible to achieve excellent rotatability and high endurance. Furthermore, it becomes possible to perform fine processing (working), thereby making it possible to achieve miniaturization of the actuator 1.

Note that the base body 2 may be formed such that the movable plate 221, the second axis members 222, 223, the driving member 211, the first axis members 212, 213 and the supporting member 23 are formed from a substrate having a laminated structure such as SOI substrate. In this case, the movable plate 221, the second axis members 222, 223, the driving member 211, the first axis members 212, 213 and the supporting member 23 are preferably formed by one layer of a substrate of a laminated structure so that those are formed integrally.

The base body 2 thus described is supported by the supporting substrate 3. The supporting substrate 3 is, as such, made mainly from glass or silicon, for example. The supporting substrate 3 has substantially the same shape as the supporting portion 23, seen in a plan view of the movable plate 221. However, it should not be construed restrictively. The shape of the supporting substrate 3 is not limited thereto as long as the supporting substrate can support the base body 2. Depending on the shape etc. of the supporting portion 23, it is also possible to omit the supporting substrate 3. The bonding technique for bonding the supporting substrate 3 thus described and the base body 2 is not limited to any particular technique. For example, it is possible to perform bonding by using adhesive or by using anodic bonding. Further, a $SiO_2$ layer made mainly from $SiO_2$, for example, may be sandwiched between the base body 2 and the supporting body 3.

As shown in FIG. 2, the plate-like opposite substrate 5 is provided so as to be opposite to the base body 2 via the supporting substrate 3. The opposite substrate 5 thus described is made mainly from, for example, glass or silicon.

Provided on the upper surface of the opposite substrate 5 is a coil 62 that is used for generating magnetic field on the permanent magnet 61. As shown in FIG. 2, the coil 62 is electrically connected to a voltage applying unit 63. A driving unit 6 is made up of such the permanent magnet 61, the coil 62 and the voltage applying unit 63.

As shown in FIG. 1 and FIG. 2, the permanent magnet 61 has a longitudinal shape. The permanent magnet 61 is bonded to the bottom surface (the surface opposite to the opposite substrate 5) of the driving member 211 through the intermediation of the spacers 81, 82. In other words, the permanent magnet 61 is provided so as to be opposite to the surface far from the light reflecting portion 221a of the movable plate 221. By this, the interference of light scanning at the light reflecting portion 221a due to the permanent magnet 61 can be reliably prevented.

The bonding technique of the spacers 81, 82 and the permanent magnet 61 is not limited to particular technique. It is also possible to bond the spacers 81, 82 and the permanent magnet 61 by using adhesive therebetween.

The permanent magnet 61 extends through the intersecting point of the rotation center axis X and the rotation center axis Y (hereinafter this intersecting point is also called intersecting point G), seen in plan view of FIG. 1, and is provided along a line segment (hereinafter this line segment is also called line segment J) inclining with respect to not only the rotation center axis X but also the rotation center axis Y.

The permanent magnet 61 thus described has with respect to the intersecting point G in the longitudinal direction south pole at one side and north pole at the other side. That is to say, the line segment (i.e. the line segment J) connecting the south pole and the north pole of the permanent magnet 61 inclines with respect to both of the rotation center axis X and the rotation center axis Y. Further, the permanent magnet 61 shown in FIG. 2 has its south pole on the left-hand side in the longitudinal direction and its north pole on the right-hand side for the sake of convenience of explanation.

The inclination angle θ of such the line segment J with respect to the rotation center axis X is preferably 30° to 60°, more preferably 40° to 50°, and yet preferably about 45'. By thus providing the permanent magnet 61, it becomes possible to let the movable plate 221 rotate extremely smoothly about the rotation center axis X and the rotation center axis Y. On the other hand, when the inclination angle θ is under the above-mentioned lower limit, there may arise the problem in that the movable plate 221 can not rotate smoothly about the rotation center axis X depending on the strength of the voltage applied to the coil 62 etc. Meanwhile, when the inclination angle θ is above the above-mentioned upper limit, there may arise the problem in that the movable plate 221 can not rotate smoothly about the rotation center axis Y depending on the strength of the voltage applied to the coil 62 etc.

According to this embodiment of the invention, the line segment J inclines with respect to the rotation center axis X and the rotation center axis Y at an angle of 45° in either case.

The permanent magnet 61 is not limited to the above-mentioned one. It is also possible to preferably use, for example, hard magnetic material magnetized such as neodymium magnet, ferrite magnet, samarium-cobalt magnet, alnico magnet and bond magnet.

The hard magnetic material already magnetized (i.e. permanent magnet) may be provided on the driving member 211 through the intermediation of the spacers 81, 82 so that they can be used as the permanent magnet 61. Further, the hard magnetic material may be provided on the driving member 211 through the intermediation of the spacers 81, 82 and then magnetized to be used as the permanent magnet 61.

A pair of the spacers 81, 82 is sandwiched between the permanent magnet 61 thus described and the driving member 211. The spacers 81, 82 form space 83 that enables prevention of the intervention between the permanent magnet 61 and the movable plate 221. By providing such the space 83, it is possible to let the movable plate 221 rotate highly smoothly about the rotation center axis Y. Further, since the use of the spacers 81, 82 makes it possible to easily form the space 83, the fabrication of the actuator 1 can be easily carried out.

Moreover, the pair of spacers 81, 82 can be used as positioning portions that makes it possible to determine the fixed position of the permanent magnet 61 on the driving member 211. In other words, the spacers 81, 82 can also be used as markings for arrangement of the permanent magnet 61. Therefore, it is possible to position the permanent magnet 61 more accurately in a desired place.

In particular, in the case of the actuator 1, the length of the spacer 81 in the width direction (i.e. direction orthogonal to the line segment J in a plan view of FIG. 1) of the permanent magnet 61 is substantially the same as the width of the permanent magnet 61 and the length of the spacer 82 in the width direction of the permanent magnet 61 is substantially the same as the width of the permanent magnet 61. Therefore, the spacers 81, 82 can be highly effectively used as positioning members for the permanent magnet 61.

The material of such the spacers 81, 82 is not limited to particular one. It is possible to use for this purpose, for example, glass, silicon, ceramics, various metal material such as Li, Be, B, Na, Mg, Al, K, Ca, Sc, V, Cr, Mn, Fe, Co, Ni, Cu, Zn, Ga, Rb, Sr, Y, Zr, Nb, Mo, Cd, In, Sn, Sb, Cs, Ba, La, Hf, Ta, W, Tl, Pb, Bi, Ce, Pr, Nd, Pm, Sm, Eu, Gd, Tb, Dy, Ho, Er, Tm, Yb, Lu, Ag, Au, Pt or Pd, various thermo-setting resins, various thermoplastic resins etc.

According to this embodiment of the invention, as shown in FIG. 2, the spacer 81 includes a base portion 811 mainly formed by $SiO_2$ and a tip portion 812 mainly formed by silicon. Likewise, the spacer 82 includes a base portion 821 mainly formed by $SiO_2$ and a tip portion 822 mainly formed by silicon. By thus forming the spacers 81, 82, it becomes possible to highly easily form the spacers 81, 82 and the driving member 211 integrally.

To be more specific, according to a method for manufacturing the actuator 1 described later, the base body 2 is formed from a Si layer on one side of the SOI substrate, the base portions 811, 812 are formed from a $SiO_2$ layer, and the tip portions 812, 822 are formed from a Si layer on the other side of the SOI substrate, thereby making it possible to form the spacers 81, 82 and the driving member 211 integrally. It should be noted, however, that the spacers 81, 82 may also be formed solely from, for example, a $SiO_2$ layer of the SOI substrate.

Furthermore, by thus forming the spacers 81, 82 and the driving member 211 integrally, the spacers 81, 82 can be more accurately positioned on the driving member 211 in a desired place.

Provided directly under the permanent magnet 61 provided on the driving member 211 through the intermediation of the spacers 81, 82 described above is the coil 62. In other words, the coil 62 is provided so as to oppose the respective bottom surfaces of the movable plate 221 and the driving member 211. By this, the magnetic field generated from the coil 62 can efficiently effect the permanent magnet 61, thereby making it possible to achieve power saving and miniaturization of the actuator 1.

As shown in FIG. 1, the coil 62 is formed, seen in a plan view of FIG. 1, so as to surround the outer periphery of the driving member 211. By thus providing the coil 62, it becomes possible to reliably prevent the driving member 211 and the coil 62 from coming into contact with each other when the actuator 1 is driven. Accordingly, it becomes possible to make the magnetic field generated from the coil 62 effect efficiently on the permanent magnet 61. That is to say, power saving and miniaturization of the actuator 1 can be achieved while the rotation angle (amplitude) of the movable plate 221 can be enlarged.

Such the coil 62 is electrically connected to the voltage applying unit 63. As the voltage applying unit 63 applies voltage to the coil 62, the coil 62 generates magnetic fields having magnetic flux in the axis direction orthogonal to both of the rotation center axis X and the rotation center axis Y. It should be noted that such the coil 62 may wind around a core.

As shown in FIG. 3, the voltage applying unit 63 includes a first voltage generating portion 631 that generates first voltage V1 for rotation of the movable plate 221 about the rotation center axis X, a second voltage generating portion 632 that generates second voltage V2 for rotation of the movable plate 221 about the rotation center axis Y, and a voltage superimposing portion 633 that superimposes the first voltage V1 and the second voltage V2 and applies the resulting voltage to the coil 62.

As shown in FIG. 4A, the first voltage generating portion 631 is used for generating the first voltage V1 (voltage for vertical scanning) changing periodically in a period T1.

The first voltage V1 has a sawtooth-like waveform. Therefore, the actuator 1 can effectively perform vertical scanning of light (sub-scanning). Note that the waveform of the first voltage V1 is not limited thereto. In this case, the frequency of the first voltage V1 (1/T1) is not limited as long as it is suitable for vertical scanning but is preferably 30 to 80 Hz (about 60 Hz).

According to this embodiment of the invention, the frequency of the first voltage V1 is adjusted so as to be different from a torsional resonance frequency of the first vibrating system 21 including the driving member 211 and the pair of first axis members 212, 213.

On the other hand, as shown in FIG. 4B, the second voltage generating portion 632 generates second voltage V2 (voltage for horizontal scanning) changing periodically in a period T2, which is different from the period T1.

The second voltage V2 has a sinusoidal waveform. Therefore, the actuator 1 can effectively perform main scanning of light. Note that the waveform of the second voltage V2 is not limited thereto.

The frequency of such the second voltage V2 is preferably larger than that of the first voltage V1. In other words, the period T2 is preferably shorter than the period T1. By this, it becomes possible to let the movable plate 221 more reliably and smoothly about the rotation center axis X with the frequency of the first voltage V1 and also about the rotation center axis Y with the frequency of the second voltage V2.

Further, the frequency of the second voltage V2 is not limited as long as it is different from the frequency of the first voltage V1 and suitable for horizontal scanning. However, the frequency of the second voltage V2 is preferably 10 to 40 Hz. By thus making the second voltage V2 be 10 to 40 Hz and the first voltage V1 be 60 Hz, as described above, the movable plate 221 can rotate about two axes (rotation center axis X and rotation center axis Y) intersecting each other with a frequency suitable for drawing on a display. However, the combination of the frequencies of the first voltage V1 and the second voltage V2 is not limited as long as the movable plate 221 can rotate about the rotation center axis X and the rotation center axis Y.

According to this embodiment of the invention, the frequency of the second voltage V2 is set so as to be the same as a torsional resonance frequency of the second vibrating system 22 including the movable plate 221 and the pair of second axis members 222, 223. In other words, the second vibrating system 22 is designed (fabricated) such that the torsional resonance frequency described above becomes suitable for horizontal scanning. Accordingly, it becomes possible to make the rotation angle of the movable plate 221 with respect to the rotation center axis Y larger.

Further, it is preferable that $f_1$ and $f_2$ satisfy the expression $f_2 \geqq f_1$, and it is more preferable that $f_1$ and $f_2$ satisfy the expression $f_2 \geqq f_1$, wherein the resonance frequency of the first vibrating system 21 is $f_1$ [Hz] and the resonance frequency of the second vibrating system 22 is $f_2$ [Hz]. By this, it becomes possible to let the movable plate 221 rotate about the rotation center axis X at the frequency of the first voltage V1 and also about the rotation center axis Y at the frequency of the second voltage V2.

The first voltage generating portion 631 and the second voltage generating portion 632 are each connected to a control portion 7 and driven based on signals from the control portion 7. The voltage superimposing portion 633 is connected to such the first voltage generating portion 631 and the second voltage generating portion 632.

The voltage superimposing portion 633 includes an superimposer 633a to be used for applying voltage to the coil 62. The superimposer 633a receives the first voltage V1 from the first voltage generating portion 631 and the second voltage V2 from the second voltage generating portion 632 and then superimposes those voltages to apply the resulting voltage to the coil 62.

The actuator 1 thus descried is driven as follows. It should be noted that according to this embodiment, the frequency of the first voltage V1 is set to be different from the torsional resonance frequency of the first voltage system 21 and the frequency of the second voltage V2 is same as the torsional resonance frequency of the second vibrating system 22 and larger than the frequency of the first voltage V1 (For instance, the frequency of the first voltage V1 is 60 Hz and the frequency of the second voltage V2 is 15 Hz).

For example, the first voltage V1 shown in FIG. 4A and the second voltage V2 shown in FIG. 4B are superimposed at the voltage superimposing portion 633 and the resulting superimposed voltage is applied to the coil 62.

Then, the magnetic field (this magnetic field is to be called magnetic field A1) that tends to draw the area around the spacer 81 of the driving member 211 toward the coil 62 by using the first voltage V1 and separate the area around the spacer 82 of the driving member 211 from the coil 62 and the magnetic field (this magnetic field is to be called magnetic field A2) that tends to separate the area around the spacer 81 of the driving member 211 from the coil 62 and draw the area around the spacer 82 of the driving member 211 toward the coil 62 are alternately switched.

In this case, seen in a plan view of FIG. 1, the spacer 81 is positioned on one side with respect to the rotation center axis X of the driving member 211 and the spacer 82 on the other side. In other words, the spacers 81, 82 are arranged so as to sandwich the rotation center axis X seen in a plan view of FIG. 1. Therefore, as the magnetic filed A1 and the magnetic field A2 described above are switched alternately, the first axis members 212, 213 are deformed to be twisted while the driving member 211 and the movable plate 221 rotate together about the rotation center axis X with the frequency of the first voltage V1.

Note that the frequency of the first voltage V1 is set to be extremely lower than the frequency of the second voltage V2. Further, the resonance frequency of the first vibrating system 21 is set to be lower than that of the second vibrating system 22 (For instance, less than tenth part of the resonance frequency of the second vibrating system 22). In other words, the first vibrating system 21 is designed to be apt to vibrate than the second vibrating system 22. Therefore, the first vibrating system 21 rotates about the rotation center axis X according to the first voltage V1. In other words, it is possible to prevent the rotation of the driving member 211 about the rotation center axis X according to the second voltage V2.

On the other hand, the magnetic field (this magnetic field is to be called magnetic field B1) that tends to draw the area around the spacer 81 of the driving member 211 toward the coil 62 by using the first voltage V1 and separate the area around the spacer 82 of the driving member 211 from the coil 62 and the magnetic field (this magnetic field is to be called magnetic field B2) that tends to separate the area around the spacer 81 of the driving member 211 from the coil 62 and draw the area around the spacer 82 of the driving member 211 toward the coil 62 are alternately switched.

In this case, seen in a plan view of FIG. 1, the spacer 81 is positioned on one side with respect to the rotation center axis Y of the driving member 211 and the spacer 82 on the other side. In other words, the spacers 81, 82 are arranged so as to sandwich the rotation center axis Y seen in a plan view of FIG. 1. Therefore, as the magnetic filed B1 and the magnetic field B2 described above are switched alternately, the second axis members 222, 223 are deformed to be twisted while the movable plate 221 rotate together about the rotation center axis Y with the frequency of the second voltage V2.

Note that the frequency of the second voltage V2 is same as the torsional resonance frequency of the second vibrating system 22. Therefore, it is possible to let the movable plate 221 rotate about the rotation center axis Y dominantly with the second voltage V2. In other words, it is possible to prevent the rotation of the movable plate 221 about the rotation center axis Y according to the first voltage V1.

As described above, in the actuator 1, by applying the voltage resulting from superimposition of the first voltage V1 and the second voltage V2 to the coil 62, the movable plate 221 can rotate about the rotation center axis X with the frequency of the first voltage V1 and also about the rotation center axis Y with the frequency of the second voltage V2. By this, low cost and miniaturization can be achieved while the movable plate 221 can rotate about both of the rotation center axis X and the rotation center axis Y.

In particular, the respective numbers of permanent magnet and the coil, which are driving source, can be reduced, so simple and small construction can be obtained.

Further, by adequately changing the first voltage V1 and the second voltage V2, desired vibrating properties can be obtained without changing design of the base body 2 or the permanent magnet 61.

Furthermore, the actuator 1 is constructed such that the permanent magnet 61 is provided on the driving member 211 and the coil 62 is provided on the opposite substrate 5 so as to oppose the permanent magnet 61. In other words, the coil 62, which is a heating body, is not provided on the first vibrating system 21. As a result, thermal expansion of the base body 2 due to heat generated from the coil 62 at the time of energization can be suppressed. Accordingly, the actuator 1 can exhibit desired vibrating properties even when it used continuously for many hours.

Such the actuator 1 can be fabricated as follows, for example.

FIG. 5A through FIG. 5H are views for illustrating a method for manufacturing the actuator 1 (corresponding to a longitudinal sectional view taken along with the line A-A of FIG. 1). Note that for the sake of convenience of explanation hereinafter the upper side of FIGS. 5A through 5H is called upper side and the bottom side bottom side.

As shown in FIG. 5A, a SOI substrate 100 to be used for forming the base body 2 and the spacers 81, 82 is prepared. Such the SOI substrate 100 has a laminated structure, in which a Si layer 100a, SiO$_2$ layer 100b and a Si layer 100c are stacked. Then, as shown in FIG. 5B, formed on the upper surface of the Si layer 100a is a resist mask M1 that has a shape corresponding to shapes seen in plan view of the movable plate 221, the second axis members 222, 223, the driving member 211, the first axis members 212, 213 and the supporting portion 23. Formed on the bottom surface of the Si layer 100c is a resist mask M2 that has shape corresponding to shapes seen in plan view of the spacers 81, 82.

After that, the Si layer 100a is subjected to etching via the resist mask M1. Then, the resist mask M1 is removed. As a result, the Si layer 100a having the movable plate 221, the second axis members 222, 223, the driving member 211, the first axis member 213, the supporting member 23 formed integrally, as shown in FIG. 5C. Note that the SiO$_2$ layer 100b functions at this time as a stop layer for etching. As such the etching method, for example, physical etching technique such as plasma etching, reactive ion etching, beam etching or light assist etching, chemical etching technique such as wet etching or the combination of two or more of those techniques can be used. It should be noted that the same technique can be used for the etching in the steps described later.

After that, the Si layer 100c is subjected to etching via the resist mask M2. Then, the resist mask M2 is removed. As a result, the Si layer 100c having the tip portion 812 of the spacer 81 and the tip portion 822 of the spacer 82 formed, as shown in FIG. 5D. In this case, the SiO$_2$ layer 100b functions as a stop layer for etching.

Then, SiO$_2$ layer 100b is removed except the area corresponding to the shapes seen in a plan view of the spacers 81, 82 so that the SiO$_2$ layer 100b having the base portion 811 of the spacer 81 and the base portion 821 of the spacer 82 formed can be obtained. In other words, the spacers 81, 82 integrally formed on the driving member 211 can be obtained. As thus the SOI substrate is used, it becomes possible to integrally form the spacers 81, 82 and the driving member 211 very easily.

After that, as shown in FIG. 5F, formed on the upper surface of the movable plate 221 is a metal film, thereby forming a light reflecting portion 221a. As such the forming technique of the metal film, there are known, for example, dry plating technique such as vacuum deposition, sputtering (low-temperature sputtering) or ion plating, wet plating technique such as electrolytic plating or electroless deposition, thermal spraying, bonding of metal layers or the like.

Then, as shown in FIG. 5G, the hard magnetic material having longitudinal shape on the bottom surface of the spacers 81, 82 is bonded to the driving member 211. Then, by energizing the hard magnetic material, the permanent magnet 61 can be obtained. As a result, the spacer 81, 82 are sandwiched between the driving member 211 and the permanent magnet 61, thereby forming the space 83.

On the other hand, the supporting substrate 3 and the opposite substrate 5 are formed by performing etching to the silicon substrate (not shown). The fabrication technique of such the supporting substrate 3 and the opposite substrate 5 is similar to the fabrication technique of the base body 2 etc. from the SOI substrate 100 and the explanation therefore is omitted. Note that the coil 62 is fixed on the upper surface of the opposite substrate 5.

Finally, the base body 2, the SOI substrate 100 having the spacers 81, 82 integrally formed, the supporting substrate 3 and the opposite substrate 5 are bonded to each other, thereby achieving the actuator 1, as shown in FIG. 5G. The bonding technique is not limited. For example, it is possible to perform bonding by using adhesive or by anodic bonding.

The actuator 1 described above includes the light reflecting portion 221a. Therefore, the actuator 1 can be preferably utilized for an optical scanner included in a laser printer, a barcode reader, a confocal scanning laser microscope, an imaging display. It should be noted that the optical scanner according to the invention has the same construction as the above-mentioned actuator and is therefore not explained here.

Figure 6:
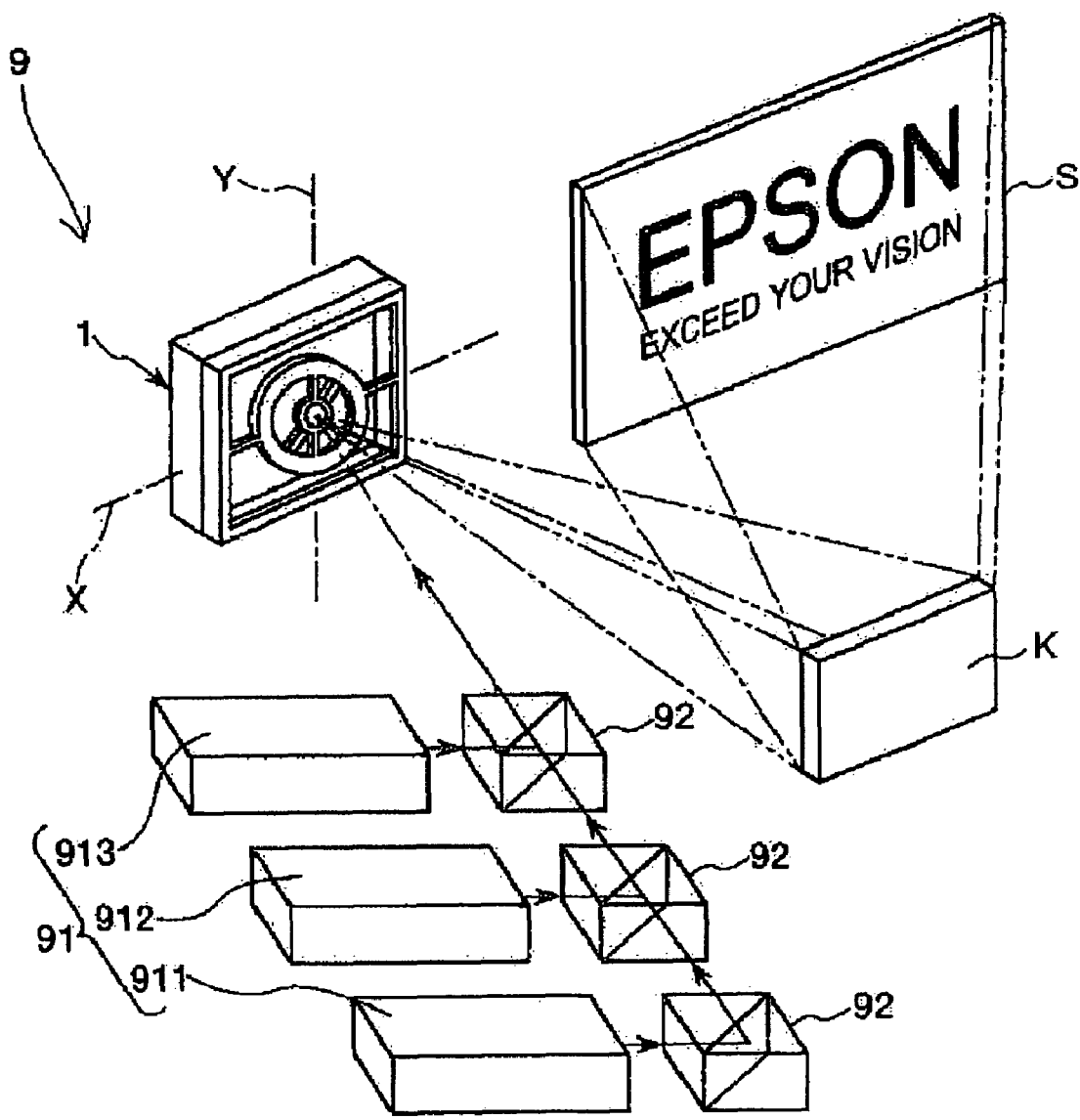
FIG. 6 is a schematic view showing an image forming apparatus according to the invention.

With reference to FIG. 6, the case in which the actuator 1 is used as an optical scanner for an imaging display, as an example of an image forming apparatus. Note that the longitudinal direction of a screen S is called lateral direction and the direction perpendicular to the longitudinal direction is called lengthwise direction. Further, the rotation center axis X is parallel to the lateral direction of the screen S and the rotation center axis Y is parallel to the lengthwise direction of the screen S.

An image forming apparatus (projector) 9 has a light source device 91 for emitting light such as laser, a plurality of dichroic mirrors 92, 92, 92 and the actuator 1.

The light source device 91 includes a red light source device 911 for emitting red light, a blue light source device 912 for emitting blue light and a green light source device 913 for emitting green light.

Each of the dichroic mirrors is an optical element that synthesizes the respective lights emitted from the red light source device 911, the blue light source device 912 and the green light source device 913.

Such the projector 9 synthesizes the lights emitted from the light source device 91 (the red light source device 911, the blue light source device 912, the green light source device 913) at the dichroic mirrors 92. The resulting synthesized light is subjected to two-dimensional scanning of the actuator 1, resulting in a color image formed on the screen S.

At the time of two-dimensional scanning, as the movable plate 221 of the actuator 1 rotates about the rotation center axis Y, the light reflected at the light reflecting portion 221a is scanned in the lateral direction of the screen S (main scanning). On the other hand, as the movable plate 221 of the actuator 1 rotates about the rotation center axis X, the light reflected at the light reflecting portion 221a is scanned in the lengthwise direction of the screen S (sub-scanning).

As shown in FIG. 5A through FIG. 5H, the light synthesized at the dichroic mirrors 92 is subjected to two-dimensional scanning of the actuator 1 and then reflected at a fixed mirror K, thereby forming an image on the screen S. However, it should not be construed restrictively. The fixed mirror K can be omitted and the light subjected to two-dimensional scanning of the actuator 1 can be directly emitted on the screen S.

As described above, the actuator, the optical scanner and the image forming apparatus have been explained with reference to the embodiments shown in the drawings. The present invention is, however, not limited thereto. In the case of the actuator, the optical scanner and the image forming apparatus according to the invention, the respective components can be substituted by any elements having similar functions or any elements may be superimposed.

Further, according to the embodiment describes above, the actuator has a symmetrical shape with respect to the rotation center axis X and the rotation center axis Y. However, the actuator may have an asymmetrical shape.

Furthermore, according to the embodiment described above, the permanent magnet has a longitudinal shape. However, the shape of the permanent magnet is not limited as long as the permanent magnet is provided such that a line segment connecting the both poles of the permanent magnet inclines with respect to the rotation center axis X and the rotation center axis Y, seen in a plan view of the movable plate. For example, the shape of the permanent magnet may be, seen in a plan view of the movable plate, a ring or a square. For instance, a pair of yokes may be provided so as to hold in the direction of the line segment connecting the both poles of the permanent magnet and magnetic flux may be conducted by those yokes.

What is claimed is:

1. An actuator, comprising:
a first vibrating system having a frame-like driving member and a pair of first axis members holding the driving member from both sides so that the driving member is rotatable about an X axis;
a second vibrating system having a movable plate provided inside the driving member and a pair of second axis members holding the movable plate on the driving members from both sides so that the movable plate is rotatable about a Y axis orthogonal to the X axis;
a driving unit including a permanent magnet provided on the driving member, a coil provided to oppose the permanent magnet and a voltage applying unit applying voltage to the coil; and
a spacer sandwiched between the driving member and the permanent magnet so as to form space preventing intervention by the movable plate,
the permanent magnet being provided such that a line segment connecting both poles of the permanent magnet inclines, in a plan view of the movable plate, with respect to the X axis and the Y axis, and
the voltage applying unit including a voltage generating portion generating a first alternating voltage and a second alternating voltage having different frequencies and a voltage superimposing portion superimposing the first voltage and the second voltage, the voltage superimposed at the voltage superimposing portion being applied to the coil so that the movable plate rotates about the X axis with a frequency of the first voltage and about the Y axis with a frequency of the second voltage.

2. The actuator according to claim 1, the spacer is integrally formed with the driving member.

3. The actuator according to claim 2, the driving member being formed from one of a Si layer of a SOI (silicon on insulator) substrate, and the spacer being formed from at least a $SiO_2$ layer, the SOI substrate having the $SiO_2$ layer, the one Si layer and the other Si layer.

4. The actuator according to claim 1, the spacer being provided as one pair.

5. The actuator according to claim 1, the frequency of the second voltage being the same as a resonance frequency of the second vibrating system, the frequency of the first voltage being different from a resonance frequency of the first vibrating system.

6. The actuator according to claim 1, the frequency of the second voltage being larger than the frequency of the first voltage.

7. The actuator according to claim 1, the permanent magnet having a longitudinal shape and being provided along a line segment passing through an intersecting point of the X axis and the Y axis and inclining with respect to one of the X axis and the Y axis at an angle of 30° to 60°.

8. The actuator according to claim 1, the coil being provided directly under the permanent magnet.

9. The actuator according to claim 1, the coil being, in a plan view of the movable plate, formed so as to surround outer periphery of the driving member.

10. The actuator according to claim 1, the movable plate including a light reflecting portion having light reflective properties on one surface thereof opposite from the other surface adjacent to the permanent magnet.

11. An optical scanner, comprising:
a first vibrating system having a frame-like driving member and a pair of first axis members holding the driving member from both sides so that the driving member is rotatable about an X axis;
a second vibrating system having a movable plate provided inside the driving member and a pair of second axis members holding the movable plate on the driving members from both sides so that the movable plate is rotatable about a Y axis orthogonal to the X axis;
a driving unit including a permanent magnet provided on the driving member, a coil provided to oppose the permanent magnet and a voltage applying unit applying voltage to the coil; and
a spacer sandwiched between the driving member and the permanent magnet so as to form space preventing intervention by the movable plate,
the permanent magnet being provided such that a line segment connecting both poles of the permanent magnet inclines, in a plan view of the movable plate, with respect to the X axis and the Y axis, and
the voltage applying unit including a voltage generating portion generating a first alternating voltage and a second alternating voltage having different frequencies and a voltage superimposing portion superimposing the first voltage and the second voltage, the voltage superimposed at the voltage superimposing portion being applied to the coil so that the movable plate rotates about the X axis with a frequency of the first voltage and about the Y axis with a frequency of the second voltage so as to perform a two-dimensional scanning of light reflected at the light reflecting portion.

12. An image forming apparatus comprising an optical scanner including:
   a first vibrating system having a frame-like driving member and a pair of first axis members holding the driving member from both sides so that the driving member is rotatable about an X axis;
   a second vibrating system having a movable plate provided inside the driving member and a pair of second axis members holding the movable plate on the driving members from both sides so that the movable plate is rotatable about a Y axis orthogonal to the X axis;
   a driving unit including a permanent magnet provided on the driving member, a coil provided to oppose the permanent magnet and a voltage applying unit applying voltage to the coil; and
   a spacer sandwiched between the driving member and the permanent magnet so as to form space preventing intervention by the movable plate,
   the permanent magnet being provided such that a line segment connecting both poles of the permanent magnet inclines, in a plan view of the movable plate, with respect to the X axis and the Y axis, and
   the voltage applying unit including a voltage generating portion generating a first alternating voltage and a second alternating voltage having different frequencies and a voltage superimposing portion superimposing the first voltage and the second voltage, the voltage superimposed at the voltage superimposing portion being applied to the coil so that the movable plate rotates about the X axis with a frequency of the first voltage and about the Y axis with a frequency of the second voltage so as to perform a two-dimensional scanning of light reflected at the light reflecting portion.

* * * * *